United States Patent
Wu et al.

(10) Patent No.: US 7,301,787 B2
(45) Date of Patent: Nov. 27, 2007

(54) ACTIVE TYPE HARMONIC SUPPRESSION APPARATUS

(75) Inventors: Chin-Chang Wu, Kaohsiung (TW);
Hung-Liang Chou, Kaohsiung (TW);
Ya-Tsung Feng, Kaohsiung (TW);
Wen-Pin Hsu, Kaohsiung (TW);
Yao-Jen Chang, Kaohsiung (TW)

(73) Assignee: UIS Abler Electronics Co., ltd., Taipei Hsien (TW)

( * ) Notice: Subject to any disclaimer, the term of this patent is extended or adjusted under 35 U.S.C. 154(b) by 52 days.

(21) Appl. No.: 11/177,337

(22) Filed: Jul. 11, 2005

(65) Prior Publication Data

US 2006/0044850 A1  Mar. 2, 2006

(30) Foreign Application Priority Data

Aug. 30, 2004  (TW)  .............. 93126019 U

(51) Int. Cl.
*H02M 1/12* (2006.01)

(52) U.S. Cl. .................. 363/39; 363/34; 307/105; 330/149

(58) Field of Classification Search ........... 363/34–41, 363/95, 97, 44; 323/207, 208, 210, 211; 307/105; 330/149, 297
See application file for complete search history.

(56) References Cited

U.S. PATENT DOCUMENTS

| 5,465,203 | A | * | 11/1995 | Bhattacharya et al. | ........ 363/40 |
| 5,526,252 | A | * | 6/1996 | Erdman | ........ 363/41 |
| 5,567,994 | A | | 10/1996 | Davis et al. | |
| 5,614,770 | A | | 3/1997 | Suelzle | |
| 5,731,965 | A | | 3/1998 | Cheng et al. | |
| 6,320,392 | B1 | | 11/2001 | Jonsson | |
| 6,472,775 | B1 | | 10/2002 | Huang et al. | |
| 6,717,465 | B2 | | 4/2004 | Chou et al. | |
| 6,940,187 | B2 | * | 9/2005 | Escobar et al. | ........ 307/64 |

\* cited by examiner

*Primary Examiner*—Rajnikant B. Patel
(74) *Attorney, Agent, or Firm*—Bacon & Thomas, PLLC

(57) ABSTRACT

An active type harmonic suppression apparatus, connected in parallel to a power feeder, supplies a compensation current for injecting into the power feeder such that a utility current of a power source is approached to a sinusoidal wave. The control circuit retrieves a load current, a utility current, an output current of the power converter, a power source voltage and a voltage of the dc power capacitor for calculating and sending a reference signal of compensation voltage to a pulse-width-modulation circuit which generates switching signals for the power converter. Furthermore, the harmonic suppression apparatus can provide a fixed or variable reactive power.

13 Claims, 5 Drawing Sheets

ACTIVE TYPE HARMONIC SUPPRESSION APPARATUS

BACKGROUND OF THE INVENTION

1. Field of the Invention

The present invention relates to an active type harmonic suppression apparatus. More particularly, the present invention relates to the active type harmonic suppression apparatus connected in parallel to a power feeder for filtering harmonic currents thereof.

2. Description of the Related Art

Recently, the controllable power electronic devices suitable for high voltage rating and large current rating characteristics have been developed due to the improvement of the semiconductor manufacturing technique. Power electronic devices are widely applied in electric power equipment, such as motor driver, arc furnace, trolley car, battery charger, and lighting appliance etc. These electric power equipment may generate a large amount of harmonic currents due to the nonlinear input characteristic of such loads. The harmonic currents may result in the problems, such as transformer overheat, rotary machine vibration, voltage quality degradation, electric power components damage, medical facilities malfunction etc. In order to improve the problems of harmonic pollution effectively, many harmonic control standards, such as IEEE519-1992, IEC1000-3-2, and IEC1000-3-4 etc., have been established. In Taiwan, there is also established a power control provisional standard for harmonic by Taiwan Power Company.

Conventionally, the passive power filter is used to solve the problems of harmonic. The passive power filter generally consists of inductor and AC capacitor. In general, the passive power filter may cause the resonance problem that may generate larger harmonic current and voltage. The resonance of the passive power filter may damage the passive power filter itself and neighboring power facilities. Additionally, it is quite hard to obtain a better filtering effect of the passive power filter due to the system reactance that may easily affect the filtering characteristic of the passive power filter. Furthermore, the harmonic current of neighboring nonlinear loads may flow into the passive power filter and result in overload of the passive power filter.

Currently, a power converter consisting of power electronic devices is carried out for filtering harmonics and disclosed in the art, such as U.S. Pat. Nos. 6,472,775 and 6,320,392.

Referring initially to FIG. 1, a schematic circuitry of a conventional active power filter is illustrated. In the illustrated circuitry, the active power filter includes a dc capacitor, a power converter and a filter element. The power converter has a current-mode control controlled to generate a compensating current via the filter element to be injected into a power feeder. The filter element is selected from an inductor or a combination of an inductor and a capacitor. The filter element is used to filter high-frequency ripple current due to the switching operation of power converter. Furthermore, in order to filter the high-frequency ripple current effectively, the selection of filter element depends on switching frequency, dc voltage of the power converter and the limitation of ripple current.

Although the active power filter performs a better filtering characteristic, the capacity of the power converter in an active power filter must be greater than the product of the harmonic current of the load and the voltage of the power source. Therefore, the manufacture cost of the power converter of the active power filter must be significantly increased so that applications of the active power filter are disadvantageously limited. Generally, the filter element of the active power filter, having lower impedance under the fundamental frequency, is only used to filter ripple current, and thus voltage of the dc capacitor must be greater than the voltage peak of the power source. However, a higher voltage of the dc capacitor may result in generating a higher ripple current. Accordingly, the filter element must employ a low-pass filter with a lower cut-off frequency for filtering higher switching ripple currents. This results in the poor transient response and an increase of overall dimensions, and further results in higher electromagnetic interference.

A hybrid power filter structure consisting of a passive power filter and a power converter is developed to overcome the capacity and cost problems caused by the power converter of the active power filter because the passive power filter is used to reduce the capacity of the power converter. For example, the hybrid power filter structure is disclosed in U.S. Pat. Nos. 5,567,994 and 5,731,965. However, these hybrid power filters employs a passive power filter having a larger inductor that may results in an increase of dimensions. Another hybrid power filter structure, such as U.S. Pat. Nos. 6,717,465 and 5,614,770, employs a capacitor which may minimize dimensions and reduce power loss. In U.S. Pat. No. 5,614,770, the hybrid power filter adopts a current-mode control. A compensation current is calculated and controlled with a feedback output current of the power converter in close loop control so that the power converter acts as a current generator. The current generator may generate a compensation current that is injected into a power feeder for filtering harmonic currents. However, the power converter with a current-mode control is limited by bandwidth and gain of the controller such that a specific error between the output current of the power converter and the calculated compensation current may be existed. In addition, the current of the power source may contain a small distortion after compensation because no power source current is detected and feedback to the controller. In U.S. Pat. No. 6,717,465, the hybrid power filter adopts a voltage-mode control. The power converter thus acts as a voltage source, and the power source current is detected and feedback to the controller, so that current waveform distortion of the power source can be reduced. In this way, the current waveform distortion problem due to no power source current feedback disclosed in U.S. Pat. No. 5,614,770 is solved. However, there is a difficulty for manufacturing the power converter disclosed in U.S. Pat. No. 6,717,465 due to pre-evaluation the value of passive elements serially connected with the power converter. In addition, it may perform poor filtering characteristics since the value of the passive element may be shifted under high temperature conditions and deterioration.

The present invention intends to provide an active type harmonic suppression apparatus so as to improve an evaluation problem for the value of the passive elements serially connected with the power converter with a voltage-mode control disclosed in U.S. Pat. No. 6,717,465. Accordingly, the hybrid power filter can be manufactured easily, and a filtering effect thereof may not be affected by deterioration of the passive elements. The present invention controls harmonic components of the output currents of the power converter and those of the load currents in a close loop control circuit so as to improve a voltage controller with a voltage-mode control, disclosed in U.S. Pat. No. 6,717,465, sensitive to the changed values of the passive elements serially connected with the power converter. The present invention can carry out a simplified control circuit block for the harmonic suppression apparatus and adjust a reactive power current supplied from the harmonic suppression apparatus.

SUMMARY OF THE INVENTION

The primary objective of this invention is to provide an active type harmonic suppression apparatus including a dc power capacitor, a power converter, a filter inductor, a reactive power compensation capacitor, a combined capacitor/resistor filtering set and a control circuit. The dc power capacitor acts as a power storage element for supplying a first dc voltage. The dc power capacitor electrically connects with the power converter so as to convert the first dc voltage into a compensation voltage. The filter inductor, the reactive power compensation capacitor and the combined capacitor/resistor filtering set converts the compensation voltage into a compensation current for injecting into a power feeder. Consequently, a utility current can be approached to a sinusoidal wave.

In the control circuit, a load current, a utility current, an output current of the power converter, a power source voltage and a dc voltage of the power converter are detected and calculated to generate an expected output voltage. The expected output voltage is sent to a pulse width modulation circuit to generate a switching signal for controlling the power converter to supply the compensation voltage. The compensation voltage is converted into the compensation current for injecting into the power feeder such that the utility current can be approached a sinusoidal wave. The harmonic suppression apparatus can further be controlled to provide a fixed or variable reactive power.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
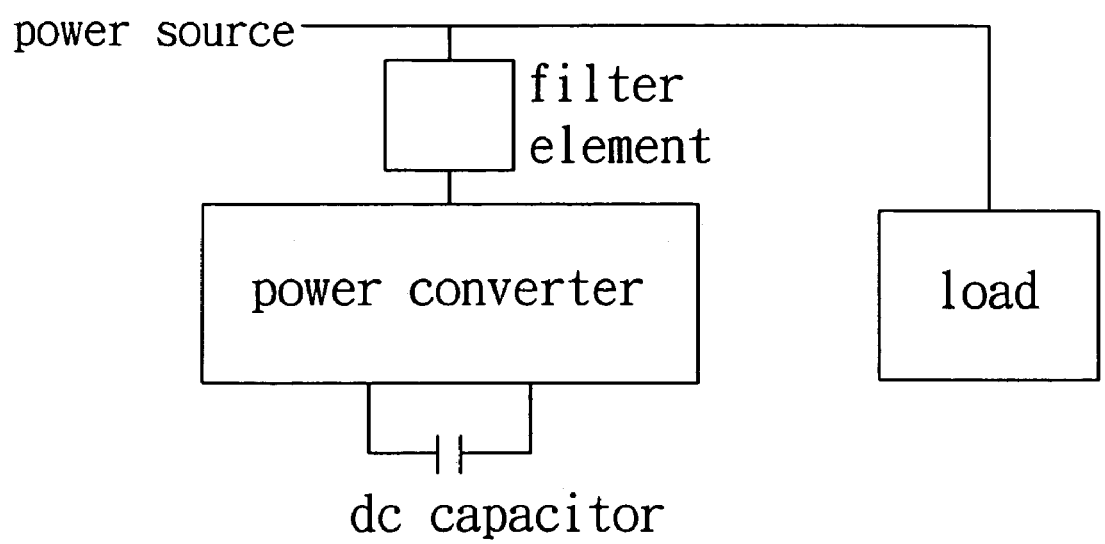
FIG. 1 is a block diagram of a conventional active power filter in accordance with the prior art.
Figure 2:
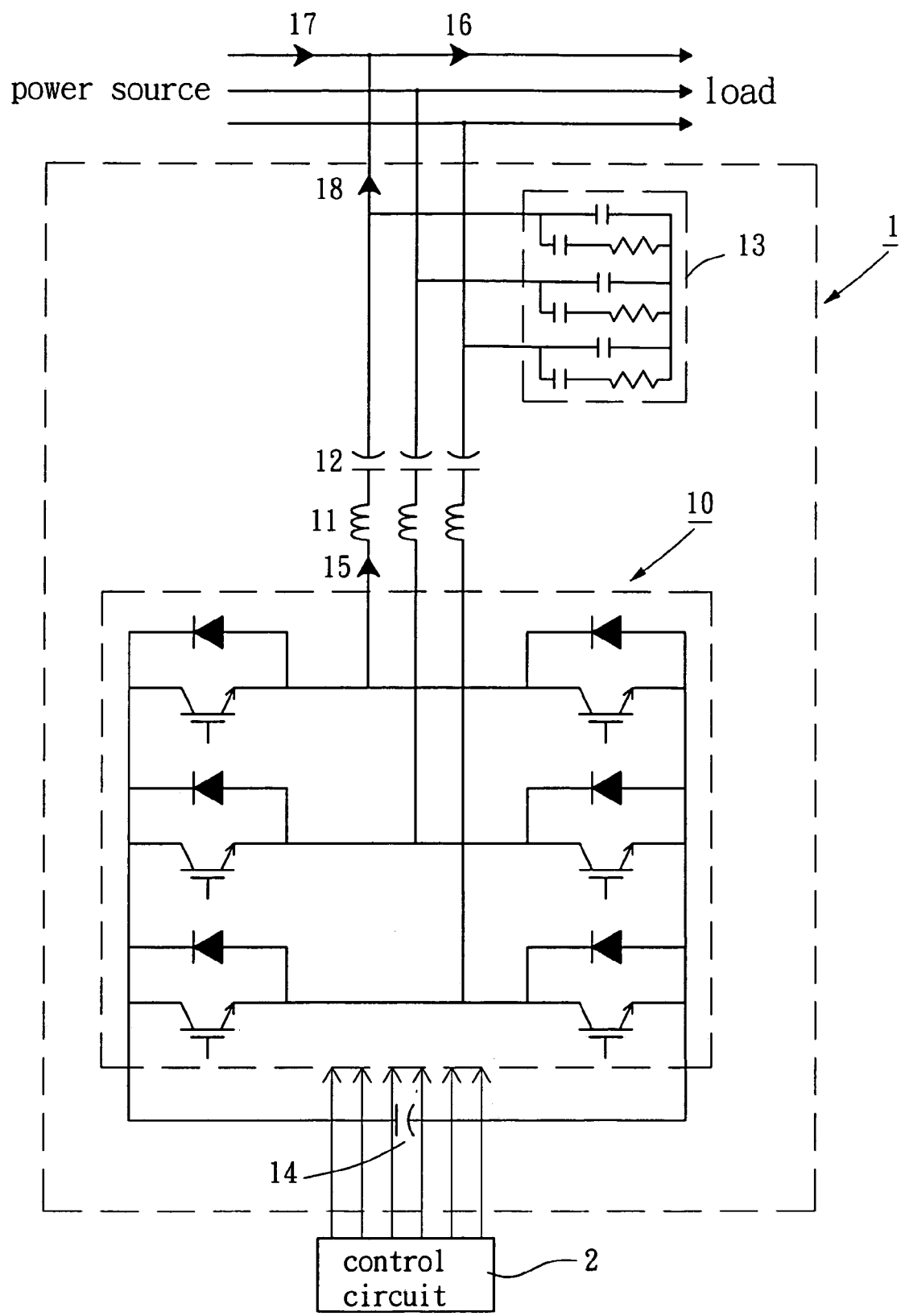
FIG. 2 is a schematic circuitry of an active type harmonic suppression apparatus in accordance with the present invention.

Referring to FIG. 2, a schematic circuitry of an active type harmonic suppression apparatus in accordance with the present invention is illustrated. The active type harmonic suppression apparatus 1 includes a power converter 10, a filter inductor 11, a reactive power compensating capacitor set 12, a combined capacitor/resistor filtering set 13, a dc power capacitor 14 and a control circuit 2. The dc power capacitor 14 acts as a power storage element for supplying a first dc voltage. The power converter 10 includes a power electronic device set and electrically connects with the dc power capacitor 14 so as to convert the first dc voltage into a compensation voltage. The filter inductor 11, the reactive power compensation capacitor 12 and the combined capacitor/resistor filtering set 13 converts the compensation voltage into a compensation current 18 for injecting into a power feeder that may filter harmonic components of a load current 16. Consequently, a utility current 17 can be approached to a sinusoidal waveform. In addition to the function of harmonic suppression, the harmonic suppression apparatus 1 can be controlled to provide a fixed reactive power.

Figure 3:
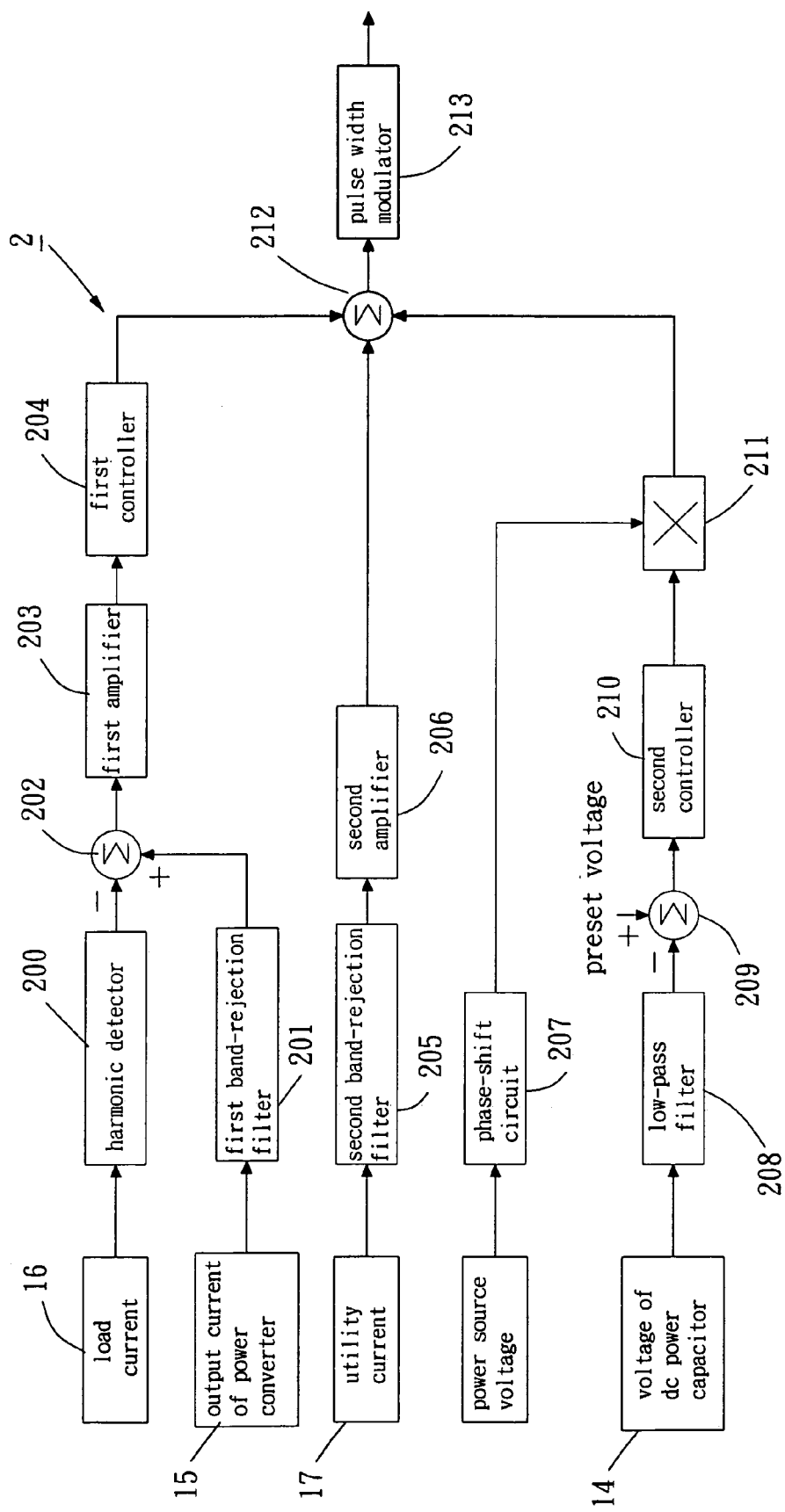
FIG. 3 is a block diagram illustrating a control circuit of the active type harmonic suppression apparatus in accordance with a first embodiment of the present invention.

Turning now to FIG. 3, a block diagram illustrating a control circuit of the active type harmonic suppression apparatus in accordance with a first embodiment of the present invention is illustrated. In the first embodiment, the active type harmonic suppression apparatus 1 performs as a harmonic current filter, and further to provide a fixed reactive power. The reactive power compensation capacitor 12 and the power source voltage commonly determine a fixed reactive power. If the impedance of filter inductor 11 is ignored, the fixed compensation reactive power can be approximately given by:

$$Q \approx 3\omega C V_{s1}^2 \quad (1)$$

wherein:

ω is a fundamental angular frequency of the power source,

C is a capacitance of the reactive power compensation capacitor 12, and $V_{s1}$ is a root-mean-square value of the fundamental component of phase voltage of the three-phase power source.

The control circuit 2 in accordance with the first embodiment of the present invention adopts a voltage-mode control and must calculate a reference compensation voltage. In the first embodiment, a load current 16, a utility current 17, an output current 15 of the power converter 10, a voltage of the dc power capacitor 14 and a power source voltage are used to calculate the reference compensation voltage. The reference compensation voltage is subsequently sent to a pulse width modulation circuit to generate switching signals for a power electronic device set of the power converter 10 which may generate a compensation voltage.

The control circuit 2 mainly includes three circuit blocks, including a harmonic compensation circuit block for the load, a harmonic suppressing circuit block for the power source and a voltage regulation circuit block for the dc power capacitor 14.

The harmonic compensation circuit block for the load is mainly used to compensate harmonic currents generated from the load. In U.S. Pat. No. 6,717,465, the power converter 10 generates harmonic voltage components, a compensation voltage, equals to the product of harmonic components of the load current 16 and composite impedances comprising the filter inductor 11 and the reactive power compensation capacitor 12 to compensate for harmonic components of the load current 16. In U.S. Pat. No.

6,717,465, a value of a passive element serially connected to the power converter must be initially predicted that may result in difficulties in manufacture. In addition, the passive element of the active type harmonic suppression apparatus 1, after long-term use, may result in poor filtering characteristics because the value of the passive element may be shifted under high temperature conditions and deterioration. In order to solve this problem, the present invention controls the harmonic components of the output current of the power converter and the load current in a close loop control. This decreases the sensitivity in calculating a reference compensation voltage to the changed values of the passive elements serially connected with the power converter 10. In the harmonic compensation circuit block for the load, the load current 16 is detected and sent to a harmonic detector 200 for retrieving harmonic components. The output current 15 of the power converter 10 is detected and sent to a first band-rejection filter 201 for filtering its fundamental component and retrieving harmonic components. The harmonic components of the load current and the output current of the power converter 10 are sent to a subtractor 202, and then sent to a first amplifier 203 for amplifying the result of the subtractor 202. Preferably, the harmonic detector 200 is selected from a band-rejection filter for filtering the fundamental components of the load current 16 and retrieving harmonic components. In an alternative embodiment, a Fourier algorithm is used to calculate predetermined orders of the harmonics of the load current 16. The harmonic current generated from the load may be fully compensated if the harmonic detector 200 is selected from a band-rejection filter. Alternatively, predetermined orders of the harmonic current generated from the load may only be selected and compensated if the harmonic detector 200 adopts a Fourier algorithm. In order to obtain a compensation voltage, the composite impedance of the filter inductor 11 and the reactive power compensation capacitor 12 multiplies an output of the first amplifier 203. A voltage of the inductor can be obtained by differentiating a current; a voltage of the capacitor can be obtained by integrating a current; and a voltage across the stray resistor in the inductor and the capacitor can be obtained by multiplying a current by a proportion. Accordingly, outputs of the first amplifier 203 multiplied by the composite impedance of the filter inductor 11 and the reactive power compensation capacitor 12 can be obtained by outputting the first amplifier 203 to a PID controller. In general, the impedance of the filter inductor 11 is evidently smaller than that of the reactive power compensation capacitor 12 under the harmonic frequencies of the active type harmonic suppression apparatus 1 so that a PI controller can replace a PID controller to avoid interference generated from a differential controller. Consequently, the output of the first amplifier 203 is sent to a first controller 204, and thus an output voltage signal of the harmonic compensation circuit block for the load can be obtained. Furthermore, the first controller 204 can be selected from a PID controller or a PI controller.

The harmonic suppressing circuit block for the power source is mainly used to correct errors of the compensation results of the harmonic compensation circuit block for the load, and to further suppress harmonic components of the power source. In the harmonic suppressing circuit block for the power source, the utility current 17 is detected and sent to a second band-rejection filter 205 for filtering fundamental component. If the utility current 17 still contains harmonics after compensating by the harmonic compensation circuit block for the load, the harmonic suppressing circuit block for the power source can further detect the harmonic components contained in the utility current 17 and then sent them to a second amplifier 206 for amplifying signals. Consequently, an output signal of the harmonic suppressing circuit block for the power source can be obtained. Harmonic components of the utility current 17 is detected in the harmonic suppressing circuit block for the power source and then amplified for compensation since the active type harmonic suppression apparatus 1 adopts a voltage-mode control that has a bandwidth much wider than that of adopting a current-mode control. Accordingly, the control method of the present invention has a compensation effect better than the current-mode control of the conventional control method. In particular, a digital circuit, such as a microcontroller or a digital signal processor, is suitable for carrying out the control method of the present invention.

In order to maintain a regulated first voltage supplied from the dc power capacitor 14 for normally operating the power converter 10, the voltage regulation circuit block for the dc power capacitor 14 must be provided. The voltage regulation circuit block for the dc power capacitor 14 must generate a fundamental voltage signal whose phase is the same as that of a fundamental current of the active type harmonic suppression apparatus 1. This results in the power converter 10 to absorb real power or to supply real power so as to maintain the dc power capacitor 14 providing with a regulated first voltage. A fundamental current of the active type harmonic suppression apparatus 1 may lead a voltage of the power source by 90-degree when the active type harmonic suppression apparatus 1 is operated under the fundamental frequency and acted as a capacitor. In the voltage regulation circuit block for the dc power capacitor 14, the first voltage of the dc power capacitor 14 is detected and sent to a low-pass filter 208 for filtering ripple voltage. An output of the low-pass filter 208 is sent to a subtractor 209 to subtract a preset voltage from it. The result of the subtractor 209 is subsequently sent to a second controller 210. Correspondingly, the voltage of the power source is detected and sent to a phase-shift circuit 207 to generate a 90-degree leading sinusoidal signal. Outputs of the phase-shift circuit 207 and the second controller 210 are sent to a multiplier 211, and thus the product of outputs of the phase-shift circuit 207 and the second controller 210 are provided. Consequently, an output signal of the voltage regulation circuit block for the dc power capacitor 14 can be obtained.

Finally, the outputs of the harmonic compensation circuit block for the load, the harmonic suppressing circuit block for the power source and the voltage regulation circuit block for the dc power capacitor 14 are sent to an adder 212, and thus the reference compensation voltage signal of the power converter 10 is obtained. Subsequently, the reference compensation voltage signal is sent to a pulse width modulator 213 to obtain a switching signal for the power electronic devices of the power converter 10.

Figure 4:
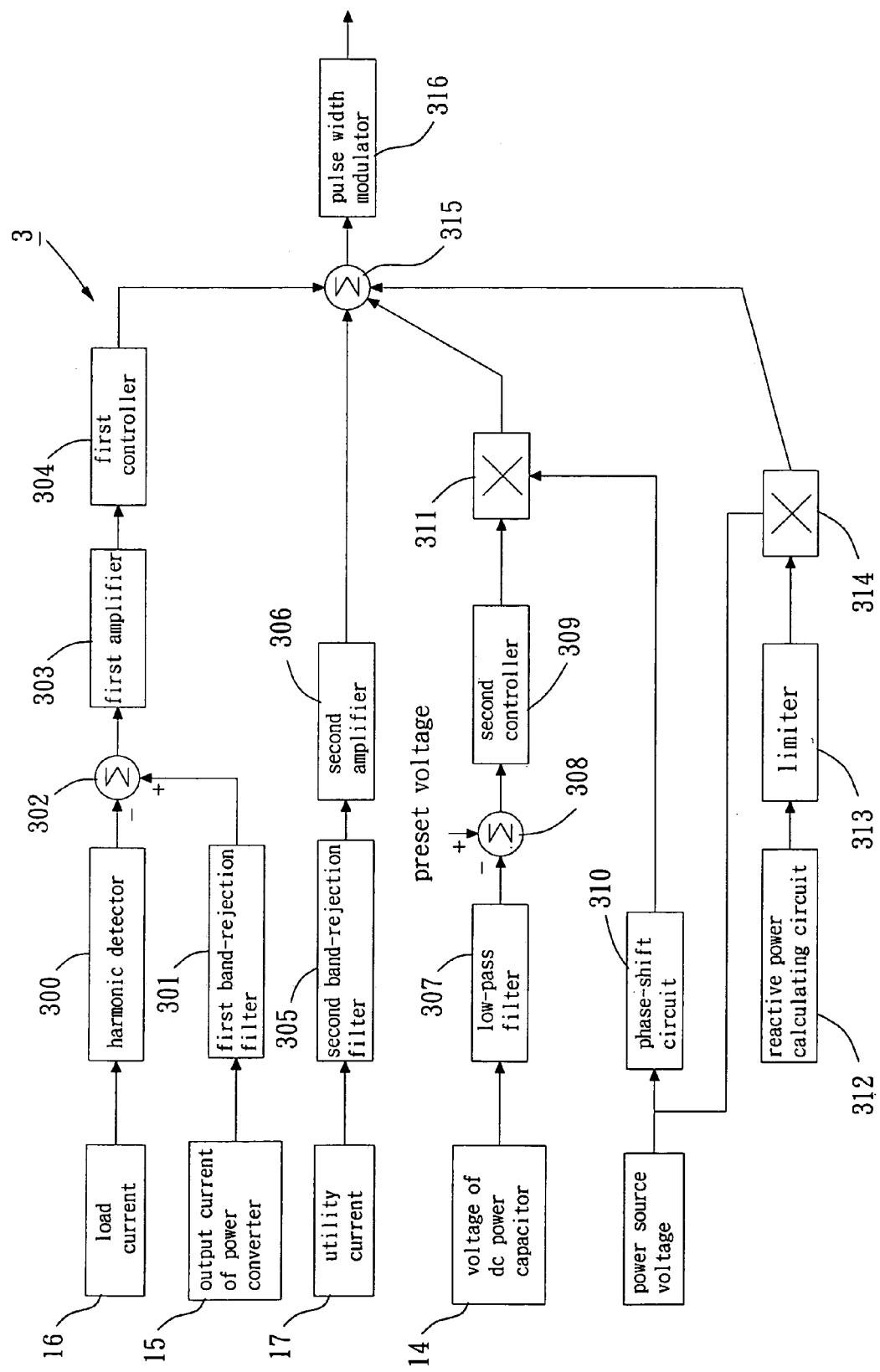
FIG. 4 is a block diagram illustrating a control circuit of the active type harmonic suppression apparatus in accordance with a second embodiment of the present invention.

Turning now to FIG. 4, a block diagram illustrating a control circuit of the active type harmonic suppression apparatus 1 in accordance with a second embodiment of the present invention is illustrated. In the second embodiment, the active type harmonic suppression apparatus 1 can perform functions of filtering harmonics and compensating a variable reactive power. However, the variable reactive power is ranging between a maximum $Q_{MAX}$ and a minimum $Q_{MIN}$. If impedance of the filter inductor 11 is neglected, the maximum $Q_{MAX}$ and the minimum $Q_{MIN}$ can be expressed as:

$$Q_{MAX} = 3\omega C V_{sl}^2 \qquad (2)$$

$$Q_{MIN} = Q_{MAX}\left(1 - \frac{V_{al,\max}}{V_{sl}}\right) \qquad (3)$$

wherein:

ω is an angular fundamental frequency of the power source,

C is a capacitance of the reactive power compensation capacitor 12, and $V_{s1}$ is a root-mean-square value of the fundamental component of phase voltage of the three-phase power source.

$V_{a1,max}$ is a root-mean-square value of the maximum fundamental component of the compensation voltage of the power converter 10.

The root-mean-square value of the maximum fundamental component of the compensation voltage of the power converter 10 can be expressed as:

$$V_{al,\max} = \frac{1}{2\sqrt{2}} V_{dc} \qquad (4)$$

wherein:

$V_{dc}$ is a first voltage of the dc power capacitor 14.

The control circuit 2 in accordance with the second embodiment of the present invention adopts a voltage-mode control and must calculate a reference compensation voltage. In the second embodiment, the load current 16, the utility current 17, the output current 15 of the power converter 10, the voltage of the dc power capacitor 14 and the power source voltage are detected to calculate the reference compensation voltage. The reference compensation voltage is subsequently sent to a pulse width modulation circuit to generate switching signals for a power electronic device set of the power converter 10 which may generate a compensation voltage.

The control circuit mainly includes four circuit blocks those are a harmonic compensation circuit block for the load, a harmonic suppressing circuit block for the power source, a voltage regulation circuit block for the dc power capacitor 14 and a reactive power adjusting circuit block.

The harmonic compensation circuit block for the load is mainly used to compensate harmonic currents generated from the load. In U.S. Pat. No. 6,717,465, the power converter 10 generates harmonic voltage components, an compensation voltage, equals to the product of harmonic components of the load current 16 and composite impedances comprising the filter inductor 11 and the reactive power compensation capacitor 12, to compensate for the harmonic components of the load current 16. In U.S. Pat. No. 6,717,465, a value of a passive element serially connected to the power converter must be initially predicted that may result in difficulties in manufacture. In addition, the passive element of the active type harmonic suppression apparatus 1, after long-term use, may result in poor filtering characteristics because the value of the passive element may be shifted under high temperature conditions and deterioration. In order to solve this problem, the present invention controls the harmonic components of the output current of the power converter and the load current in a close loop control. This decreases the sensitivity of calculating a reference compensation voltage to the changed value of the passive elements serially connected with the power converter 10. In the harmonic compensation circuit block for the load, the load current 16 is detected and sent to a harmonic detector 300 for retrieving harmonic components. The output current 15 of the power converter 10 is detected and sent to a first band-rejection filter 301 for filtering its fundamental component and retrieving harmonic components. The harmonic components of the load current and the output current 15 of the power converter 10 are sent to a subtractor 302, and then the output of subtractor 302 is sent to a first amplifier 303. Preferably, the harmonic detector 300 is selected from a band-rejection filter for filtering the fundamental component of the load current and retrieving harmonic components. In an alternative embodiment, a Fourier algorithm is used to calculate predetermined orders of the harmonics of the load current. The harmonic current generated from the load may be fully compensated if the harmonic detector 300 is selected from a band-rejection filter. Alternatively, predetermined orders of the harmonic current generated from the load may only be selected and compensated if the harmonic detector 300 adopts a Fourier algorithm. In order to obtain a compensation voltage, the composite impedance of the filter inductor 11 and the reactive power compensation capacitor 12 multiplies an output of the first amplifier 303. A voltage of the inductor can be obtained by differentiating a current; a voltage of the capacitor can be obtained by integrating a current; and a voltage across the stray resistor of the inductor and the capacitor can be obtained by multiplying a current by a proportion. Accordingly, outputs of the first amplifier 303 multiplied by the composite impedance of the filter inductor 11 and the reactive power compensation capacitor 12 can be obtained by outputting the first amplifier 303 to a PID controller. The impedance of the filter inductor 11 is evidently smaller than that of the reactive power compensation capacitor 12 under the general harmonic frequencies of the active type harmonic suppression apparatus 1 so that a PI controller can replace a PID controller to avoid interference generated from a differential controller. Consequently, the output of the first amplifier 303 is sent to a first controller 304, and thus an output voltage signal of the load harmonic compensation circuit can be obtained. Furthermore, the first controller 304 can be selected from a PID controller or a PI controller.

The harmonic suppressing circuit block for the power source is mainly used to correct errors of compensation results of the harmonic compensation circuit block for the load, and to further suppress harmonic components of the power source. In the harmonic suppressing circuit block for the power source, the utility current 17 is detected and sent to a second band-rejection filter 305 for filtering the fundamental component. After compensating in the harmonic compensation circuit block for the load, if the utility current 17 still contains harmonics, the harmonic suppressing circuit block can further detect the harmonics contained in the utility current 17 and then sent them to a second amplifier 306 for amplifying signals. Consequently, an output signal of the harmonic suppressing circuit block for the power source can be obtained. Harmonic components of the utility current 17 is detected in the harmonic suppressing circuit block for the power source and then amplified for compensation since the active type harmonic suppression apparatus 1 adopts a voltage-mode control that has a bandwidth much wider than that of adopting a current-mode control. Accordingly, the control method of the present invention has a compensation effect better than the current-mode control of the conventional control method. In particular, a digital circuit, such as a micro-controller or a digital signal processor, is suitable for carrying out the control method of the present invention.

In order to maintain a regulated first voltage supplied from the dc power capacitor 14 for normally operating the power converter 10, the voltage regulation circuit block for the dc power capacitor 14 must be provided. The voltage regulation circuit block for the dc power capacitor 14 must generate a fundamental voltage signal whose phase is the same as that of the fundamental current of the active type harmonic suppression apparatus 1. This results in the power converter 10 to absorb real power or to supply real power so as to maintain the dc power capacitor 14 providing with a regulated first voltage. A fundamental current of the active type harmonic suppression apparatus 1 may lead a voltage of the power source by 90-degree when the active type harmonic suppression apparatus 1 is operated under fundamental frequency and acted as a capacitor. In the voltage regulation circuit block for the dc power capacitor 14, the first voltage of the dc power capacitor 14 is detected and sent to a low-pass filter 307 for filtering ripple voltage. An output of the low-pass filter 307 is sent to a subtractor 308 to subtract a preset voltage from it. The result of the subtractor 308 is subsequently sent to a second controller 309. Correspondingly, the voltage of the power source is detected and sent to a phase-shift circuit 310 to generate a 90-degree leading sinusoidal signal. Outputs of the phase-shift circuit 310 and the second controller 309 are sent to a multiplier 311, and thus the product of outputs of the phase-shift circuit 310 and the second controller 309 are provided. Consequently, an output signal of the voltage regulation circuit block for the dc power capacitor 14 can be obtained.

The reactive power adjusting circuit is mainly used to adjust reactive power supplied from the active type harmonic suppression apparatus 1. The reactive power supplied from the active type harmonic suppression apparatus 1 can be calculated from:

$$Q = Q_{MAX}\left(1 - \frac{V_{a1}}{V_{s1}}\right) \quad (5)$$

wherein:

$V_{a1}$ is a root-mean-square value of the fundamental component of the compensation voltage of the power converter.

As seen in equation 5, the fundamental component of the compensation voltage of the power converter 10 with the same phase as that of the fundamental component of the power source voltage can adjust the reactive power supplied from the active type harmonic suppression apparatus 1. In the reactive power adjusting circuit, a reactive power calculating circuit 312 calculates a reactive power for compensation and sends it to a limiter 313 for supplying an amplitude signal of fundamental component of the compensation voltage of the power converter 10. Outputs of the limiter 313 and the power source voltage are further sent to a multiplier 314. Consequently, an output signal of the reactive power adjusting circuit can be obtained. The limiter 313 is mainly used to maintain the reactive power ranging between the maximum $Q_{MAX}$ and the minimum $Q_{MIN}$ supplied from the active type harmonic suppression apparatus 1. The structure of the reactive power calculating circuit 312 will be described more detail as follows.

Figure 5:
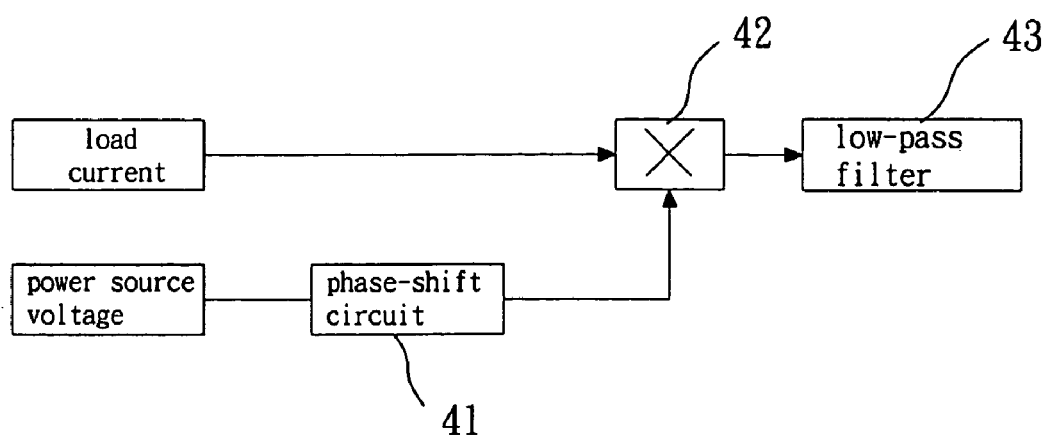
FIG. 5 is a block diagram illustrating a reactive power calculating circuit of the active type harmonic suppression apparatus in accordance with an embodiment of the present invention.
Figure 6:
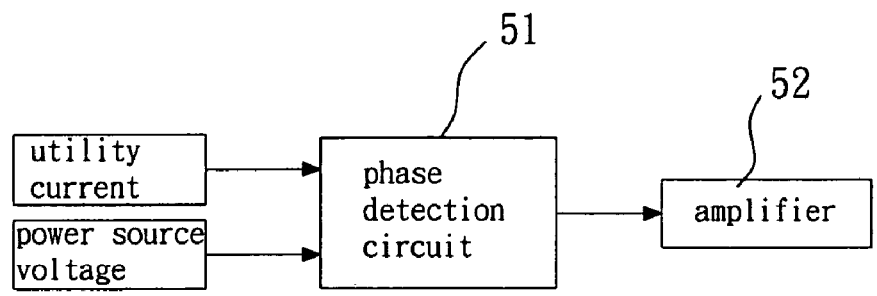
FIG. 6 is a block diagram illustrating another reactive power calculating circuit of the active type harmonic suppression apparatus in accordance with an alternative embodiment of the present invention.

Turning now to FIGS. 5 and 6, block diagrams of the reactive power calculating circuit of the active type harmonic suppression apparatus 1 in accordance with the preferred embodiments of the present invention are illustrated.

Referring to FIG. 5, in the preferred embodiment of the reactive power calculating circuit, a power source voltage is sent to a phase-shift circuit 41 to generate a 90-degree leading voltage. The output of phase-shift circuit 41 and the detected load current 16 are sent to a multiplier 42, and a result of the multiplier 42 is further sent to a low-pass filter 43 so as to retrieve a mean value that is a compensation reactive power.

Referring to FIG. 6, in the alternative embodiment of the reactive power calculating circuit, a power source voltage and a utility current 17 are sent to a phase detection circuit 51 to retrieve a phase difference between the power source voltage and the utility current 17 from the power source. Output of the phase detection circuit 51 is further sent to an amplifier 52 to obtain the compensation reactive power.

Referring back to FIG. 4, finally, the outputs of the harmonic compensation circuit block for a load, the harmonic suppressing circuit block for a power source, the voltage regulation circuit block for the dc power capacitor 14 and the reactive power adjusting circuit are sent to an adder 315, and thus the reference compensation voltage signal of the power converter 10 is obtained. Subsequently, the reference compensation voltage signal is sent to a pulse width modulator 316 to obtain driving signals for the power electronic devices of the power converter 10.

The power converter 10 serially connected with the reactive power compensation capacitor 12 in accordance with the present invention can lower the first voltage supplied from the dc power capacitor 14. This results in effectively lowering a ripple current generated from switching operation of the power electronic devices of the power converter 10. Additionally, the control circuit 2 in accordance with the present invention adopts a voltage-mode control that may lower high-frequency harmonic currents. Therefore, the active type harmonic suppression apparatus 1 in accordance with the present invention permits employing a small filter inductor 11 so that entire dimension, weight, power loss of the filter inductor 11, and manufacture cost may be reduced.

In contrast, a voltage of the dc side of the power converter in accordance with the present invention is lower than that of the conventional active type power filter such that a ripple current of the power converter in accordance with the present invention is lower than that of the conventional active type power filter.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. An active type harmonic suppression apparatus comprising:
   a dc power capacitor providing a regulated dc voltage;
   a power converter including a power electronic device set, the power converter electrically connected with the dc capacitor, and being switched for generating a compensation voltage;
   a filter inductor electrically connected with the power converter for filtering a ripple current generated from switching the power converter;
   a reactive power compensation capacitor connected in series with the filter inductor for acting as a reactive power generator, the reactive power compensation capacitor lowering the dc voltage of the power converter;

a combined capacitor/resistor filtering set electrically connected between the reactive power compensation capacitor and a power line of a power source such that the combined capacitor/resistor filtering set is used for further filtering ripple current generated from switching the power converter; and a control circuit for calculating a reference signal for the compensation voltage, and controlling the power electronic device set of the power converter, said control circuit using a load current, a utility current, an output current of the power converter, a voltage of the dc power capacitor and a power source voltage to calculate said reference signal for controlling the power converter;

wherein the filter inductor, the reactive power compensation capacitor and the combined capacitor/resistor filtering set converts the compensation voltage into a compensation current for injecting into a power feeder, and thereby a utility current supplied from a power source is approximated as a sinusoidal waveform such that the active type harmonic suppression apparatus is provided with a fixed reactive power.

2. An active type harmonic suppression apparatus as, comprising:

a dc power capacitor providing a regulated dc voltage;

a power converter including a power electronic device set, the power converter electrically connected with the dc capacitor, and being switched for generating a compensation voltage;

a filter inductor electrically connected with the power converter for filtering a ripple current generated from switching the power converter;

a reactive power compensation capacitor connected in series with the filter inductor for acting as a reactive power generator, the reactive power compensation capacitor lowering the dc voltage of the power converter;

a combined capacitor/resistor filtering set electrically connected between the reactive power compensation capacitor and a power line of a power source such that the combined capacitor/resistor filtering set is used for further filtering ripple current generated from switching the power converter; and a control circuit for calculating a reference signal for the compensation voltage, and controlling the power electronic device set of the power converter, wherein the control circuit adopting a voltage-mode control; wherein the control circuit including a harmonic compensation circuit block for a load, a harmonic suppressing circuit block for a power source and a voltage regulation circuit block for the dc power capacitor which are connected to an adder, and wherein the filter inductor, the reactive power compensation capacitor and the combined capacitor/resistor filtering set converts the compensation voltage into a compensation current for injecting into a power feeder, and thereby a utility current supplied from a power source is approximated as a sinusoidal waveform such that the active type harmonic suppression apparatus is provided with a fixed reactive power.

3. The active type harmonic suppression apparatus as defined in claim 2, wherein the harmonic compensation circuit block for the load includes a harmonic detector, a first band-rejection filter, a subtractor, a first amplifier and a first controller; the harmonic detector detecting a load current for retrieving harmonic components; sending an output current of the power converter to the first band-rejection filter for filtering its fundamental components and retrieving harmonic components; sending the harmonic components of the load current and the output current of the power converter to the subtractor for subtraction; sending a result of the subtractor to the first amplifier; and sending an output of the first amplifier to the first controller to obtain an output voltage of the harmonic compensation circuit.

4. The active type harmonic suppression apparatus as defined in claim 2, wherein the harmonic suppressing circuit block for the power source includes a second band-rejection filter and a second amplifier; the harmonic suppressing circuit block detecting a utility current; sending the utility current to the second band-rejection filter for filtering fundamental components; and sending an output of second band-rejection filter to the second amplifier to obtain an output voltage of the harmonic suppressing circuit.

5. The active type harmonic suppression apparatus as defined in claim 2, wherein the voltage regulation circuit block for the dc power capacitor includes a phase-shift circuit, a low-pass filter, a subtractor, a second controller and a multiplier; the voltage regulation circuit block sending a voltage of the dc power capacitor to the low-pass filter for filtering ripple voltage; sending an output of the low-pass filter to the subtractor to subtract a preset voltage; sending a result of the subtractor to the multiplier; sending a utility voltage to the phase-shift circuit block for generating a 90-degree leading sinusoidal signal; and sending an output of the phase-shift circuit to the multiplier to obtain an output voltage of the voltage regulation circuit.

6. An active type harmonic suppression apparatus comprising:

a dc power capacitor providing a regulated dc voltage;

a power converter including a power electronic device set, the power converter electrically connected with the dc capacitor, and being switched for generating a compensation voltage;

a filter inductor electrically connected with the power converter for filtering a ripple current generated from switching the power converter;

a reactive power compensation capacitor connected in series with the filter inductor for acting as a reactive power generator, the reactive power compensation capacitor lowering the dc voltage of the power converter;

a combined capacitor/resistor filtering set electrically connected between the reactive power compensation capacitor and a power line of power source such that the combined capacitor/resistor filtering set is used for further filtering ripple current generated from switching the power converter; and a control circuit for calculating a reference signal for the compensation voltage, and controlling the power electronic device set of the power converter, said control circuit using a load current, a utility current, an output current of the power converter, a voltage of the dc power capacitor and a power source voltage to calculate said reference signal for controlling the power converter;

wherein the filter inductor, the reactive power compensation capacitor and the combined capacitor/resistor filtering set converts the compensation voltage into a compensation current for injecting into a power feeder, and thereby a utility current supplied from a power source is approximated as a sinusoidal waveform such that the harmonic suppression apparatus is provided with a variable reactive power.

7. An active type harmonic suppression apparatus, comprising:

a dc power capacitor providing a regulated dc voltage;

a power converter including a power electronic device set, the power converter electrically connected with the dc capacitor, and being switched for generating a compensation voltage;

a filter inductor electrically connected with the power converter for filtering a ripple current generated from switching the power converter;

a reactive power compensation capacitor connected in series with the filter inductor for acting as a reactive power generator, the reactive power compensation capacitor lowering the dc voltage of the power converter;

a combined capacitor/resistor filtering set electrically connected between the reactive power compensation capacitor and a power line of power source such that the combined capacitor/resistor filtering set is used for further filtering ripple current generated from switching the power converter; and a control circuit for calculating a reference signal for the compensation voltage, and controlling the power electronic device set of the power converter;

wherein the control circuit adopting a voltage-mode control, and including a harmonic compensation circuit block for a load, a harmonic suppressing circuit block for a power source, a voltage regulation circuit block for the dc power capacitor and a reactive power adjusting circuit which are connected to an adder, and wherein the filter inductor, the reactive power compensation capacitor and the combined capacitor/resistor filtering set converts the compensation voltage into a compensation current for injecting into a power feeder, and thereby a utility current supplied from a power source is approximated as a sinusoidal waveform such that the harmonic suppression apparatus is provided with a variable reactive power.

8. The active type harmonic suppression apparatus as defined in claim 7, wherein the harmonic compensation circuit block for the load includes a harmonic detector, a first band-rejection filter, a subtractor, a first amplifier and a first controller; the harmonic detector detecting a load current for retrieving harmonic components; sending an output current of the power converter to the first band-rejection filter for filtering its fundamental components and retrieving harmonic components; sending the harmonic components of the load current and the output current of the power converter to the subtractor for subtraction; sending a result of the subtractor to the first amplifier; and sending an output of the first amplifier to the first controller to obtain an output voltage of the harmonic compensation circuit.

9. The active type harmonic suppression apparatus as defined in claim 7, wherein the harmonic suppressing circuit block for the power source includes a second band-rejection filter and a second amplifier; the harmonic suppressing circuit block detecting a utility current; sending the utility current to the second band-rejection filter for filtering fundamental components; and sending an output of second band-rejection filter to the second amplifier to obtain an output voltage of the harmonic suppressing circuit.

10. The active type harmonic suppression apparatus as defined in claim 7, wherein the voltage regulation circuit block for the dc power capacitor includes a phase-shift circuit, a low-pass filter, a subtractor, a second controller and a multiplier; the voltage regulation circuit block sending a voltage of the dc power capacitor to the low-pass filter for filtering ripple voltage; sending an output of the low-pass filter to the subtractor to subtract a preset voltage; sending a result of the subtractor to the multiplier; sending a utility voltage to the phase-shift circuit block for generating a 90-degree leading sinusoidal signal; and sending an output of the phase-shift circuit to the multiplier to obtain an output voltage of the voltage regulation circuit.

11. The active type harmonic suppression apparatus as defined in claim 7, wherein the reactive power adjusting circuit includes a reactive power calculating circuit, a limiter and a multiplier; the reactive power calculating circuit calculating a reactive power for compensation and sending it to a limiter and sending outputs of the limiter to a multiplier to obtain an output signal of the reactive power adjusting circuit, the reactive power adjusting circuit limiting the reactive power ranging between a maximum and a minimum supplied from the harmonic suppression apparatus.

12. The active type harmonic suppression apparatus as defined in claim 11, wherein the reactive power calculating circuit includes a phase-shift circuit, a multiplier and a low-pass filter; the phase-shift circuit converting a power source voltage into a 90-degree leading voltage; the multiplier multiplying the 90-degree leading voltage of the power source and the load current and sending a result of the multiplier to the low-pass filter so as to retrieve a mean component as well as a reactive power compensation.

13. The active type harmonic suppression apparatus as defined in claim 11, wherein the reactive power calculating circuit includes a phase detection circuit and an amplifier; the phase detection circuit detecting a phase difference between the power source voltage and the utility current and sending an output of the phase detection circuit to the amplifier to obtain the reactive power compensation.

* * * * *

UNITED STATES PATENT AND TRADEMARK OFFICE
CERTIFICATE OF CORRECTION

PATENT NO.         : 7,301,787 B2
APPLICATION NO. : 11/177337
DATED              : November 27, 2007
INVENTOR(S)       : Chin-Chang Wu et al.

It is certified that error appears in the above-identified patent and that said Letters Patent is hereby corrected as shown below:

Title page, item [73]. Assignee: should read as follows: --Ablerex Electronics Co., Ltd.--.

Signed and Sealed this

Seventh Day of October, 2008

JON W. DUDAS
*Director of the United States Patent and Trademark Office*